UNITED STATES PATENT OFFICE.

ROBERT F. LAIRD, OF ANDERSON, INDIANA, ASSIGNOR OF ONE-HALF TO ROBERT F. HYATT, OF ANDERSON, INDIANA.

POWER STEERING-GEAR.

1,355,152.  Specification of Letters Patent.  Patented Oct. 12, 1920.

Application filed March 8, 1920. Serial No. 363,949.

*To all whom it may concern:*

Be it known that I, ROBERT F. LAIRD, a citizen of the United States, residing at Anderson, in the county of Madison and State of Indiana, have invented a new and useful Power Steering-Gear, of which the following is a specification.

The object of my invention is to provide an improved power steering gear, designed to apply power to the work of steering heavy trucks, tractors, boats, etc., that are difficult to guide with ordinary steering gear, unless same is geared so low that action is very slow.

Figure 1:
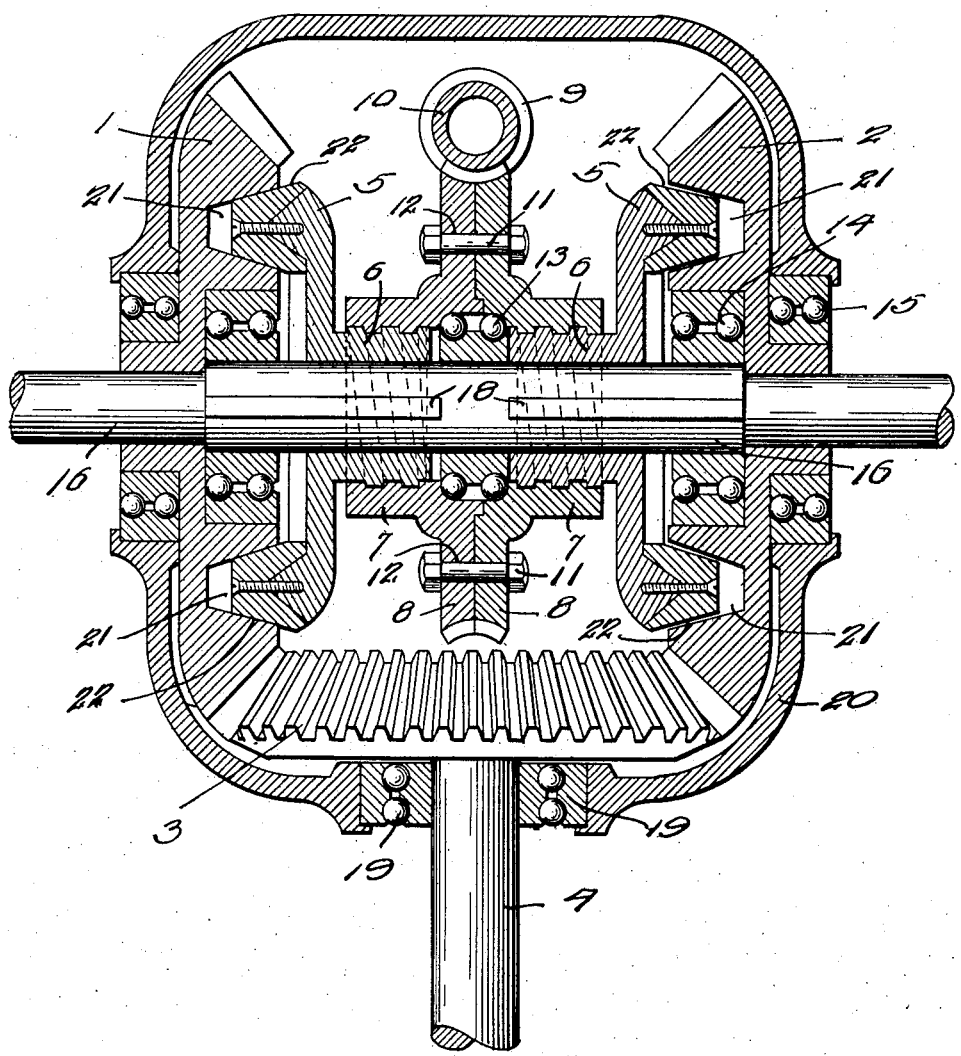
Figure 2:
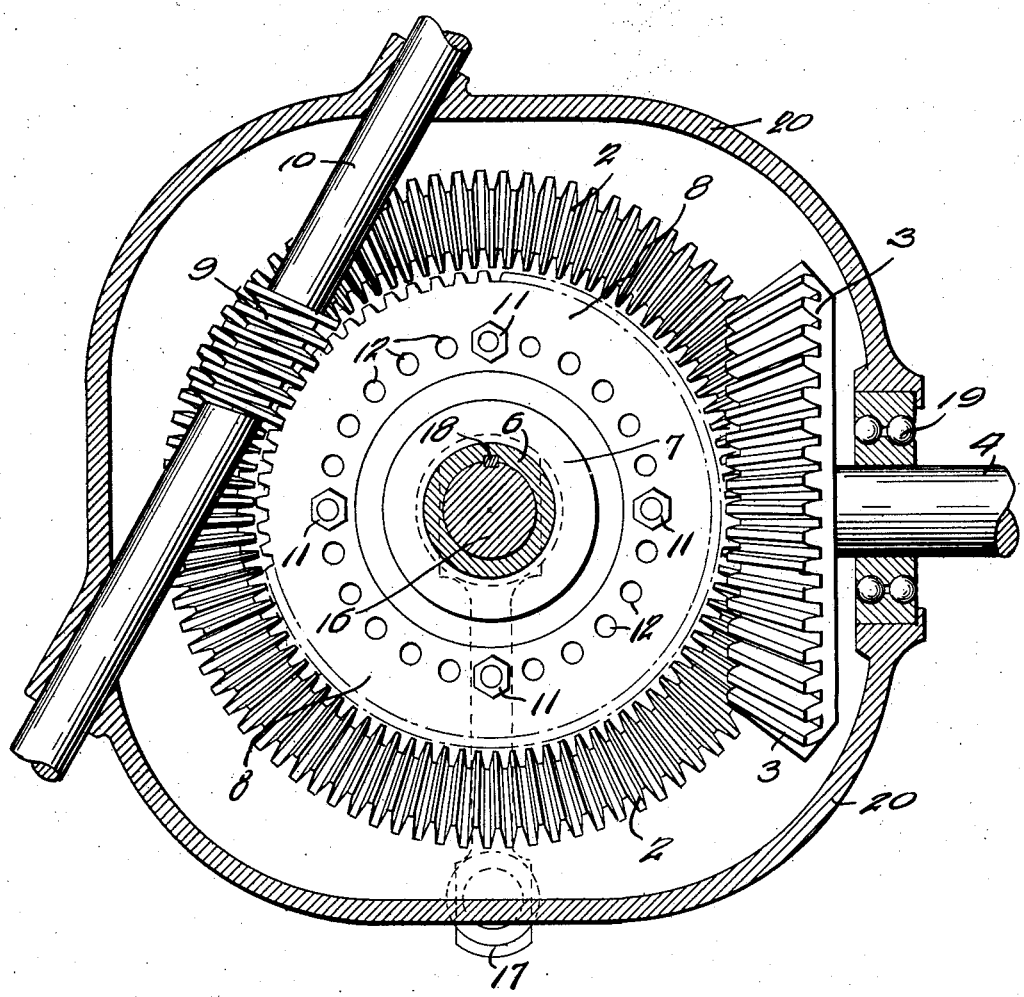

Figure 1 is a vertical transverse section of my invention, partly in elevation; and Fig. 2 is a vertical longitudinal section, partly in elevation.

Referring to the accompanying drawings, I provide a housing 20 having ball bearings 15 for oppositely arranged gears 1 and 2 which are mounted on central shaft 16. Gears 1 and 2 mesh with gear 3, disposed at right angles to them, and driving them in opposite directions. Gear 3 is mounted on engine driven shaft 4, which is mounted on suitable ball bearings 19. Gears 1 and 2 are each provided with an annular beveled recess 21, adapted to receive the correspondingly tapered annular friction clutch elements 22 of clutches 5. Clutches 5 are provided with screw threaded extensions 6. These extensions 6 have a threaded engagement with hub members 7 of worm wheel sections 8. Said worm wheel sections 8 are provided with apertures 12, in which are mounted bolts 11, to fasten these members together, as shown in Fig. 1, thus forming a complete worm wheel. One section is provided with circle of holes to permit adjustment of clutches. The worm wheel 8 meshes with worm 9 on the steering post 10, as shown in Fig. 2. I provide a suitable ball bearing 13 for the sections of worm wheel 8, as shown in Fig. 1. Clutches 5 are slidably mounted on central shaft 16, which is provided with longitudinal keys 18, as shown in Fig. 1. Central shaft 16, as indicated in Fig. 2, is provided with a crank arm 17, which is connected to the steering knuckle (not shown). I provide ball bearings 14 mounted on the enlarged portion of central shaft 16 for gears 1 and 2, as shown in Fig. 1.

Gears 1 and 2 move freely on shaft 16 and also function as the female halves of the clutch mechanism. Clutches 5, which constitute the male halves of the clutch mechanism, are keyed to shaft 16 by keys 18, and are movable longitudinally of said shaft, their range of movement being controlled by worm wheel 8, which operates to cause the clutches to engage and disengage. Worm wheel 8 is operated by worm 9 on steering post 10, the steering post being mounted in the usual manner. Gears 1 and 2 are always turning in opposite directions whenever the engine is running, getting their power from gear 3, which is mounted on the engine driven shaft 4. When the driver turns the steering wheel and thereby steering post 10 and worm 9, the worm wheel 10 is rotated and as it is, hub members 7, which are interiorly threaded, rotate the threaded extensions or hubs 6 of clutches 5 in the same direction on the shaft. This causes one of the clutches 5 to contact with the adjacent gear (either gear 1 or gear 2, as the case may be). The friction engagement of the clutch with the gear, for example with gear 1, as shown in Fig. 1, will cause the clutch to turn with that gear, thus turning shaft 16 and steering arm 17. As soon as the driver stops turning the steering wheel, the clutch which was engaged disengages and the motion of the wheel is no longer conveyed to the shaft 16. If roughness of road should cause the truck wheels to lurch while the steering wheel is held still, the clutch will automatically cause the gears to straighten out the wheels. The same would be true if wind or waves should change the course of the vessel having this power steering gear.

It is within the contemplation of my invention to apply this device to either trucks, tractors or vessels.

What I claim is:

1. In a power steering gear, the combination of a gear mounted on the engine shaft, gears meshing with said gear and turning in opposite directions, said gears forming the female halves of clutch mechanism, friction clutches adapted to engage and disengage from the aforesaid clutch gears said clutches having threaded hubs, a shaft having longitudinal keys engaging said clutches to permit of sliding longitudinal movement relative to the shaft, a worm wheel having threaded hub members engaging the hubs of the aforesaid clutches, and a worm mounted on the steering post in operative engagement with the aforesaid worm wheel.

2. In combination with the apparatus described in claim 1, a housing completely inclosing the aforesaid mechanism and having ball bearings on which the respective shafts are mounted.

ROBERT F. LAIRD.